(12) United States Patent
Bikson

(10) Patent No.: US 12,264,288 B1
(45) Date of Patent: Apr. 1, 2025

(54) SYSTEM AND METHOD FOR CLEANING OF BIOGAS

(71) Applicant: Unconventional Gas Solutions, LLC, Houston, TX (US)

(72) Inventor: Benjamin Bikson, Newton, MA (US)

(73) Assignee: Unconventional Gas Solutions, LLC, Houston, TX (US)

( * ) Notice: Subject to any disclaimer, the term of this patent is extended or adjusted under 35 U.S.C. 154(b) by 0 days.

(21) Appl. No.: 18/424,009

(22) Filed: Jan. 26, 2024

(51) Int. Cl.
*B01D 53/22* (2006.01)
*B01D 53/02* (2006.01)
*B01D 53/26* (2006.01)
*B01D 53/52* (2006.01)
*B01D 53/62* (2006.01)
(Continued)

(52) U.S. Cl.
CPC .............. *C10L 3/104* (2013.01); *B01D 53/02* (2013.01); *B01D 53/226* (2013.01); *B01D 53/228* (2013.01); *B01D 53/229* (2013.01); *B01D 53/265* (2013.01); *B01D 53/526* (2013.01); *B01D 53/62* (2013.01); *B01D 53/75* (2013.01); *B01D 53/84* (2013.01); *B01D 53/8618* (2013.01); *C10L 3/103* (2013.01); *C10L 3/106* (2013.01); *B01D 2053/224* (2013.01); *B01D 2253/102* (2013.01); *B01D 2253/25* (2013.01); *B01D 2256/245* (2013.01); *B01D 2257/104* (2013.01); *B01D 2257/304* (2013.01); *B01D 2257/504* (2013.01); *B01D 2257/80* (2013.01); *B01D 2258/05* (2013.01); *C10L 2290/26* (2013.01); *C10L 2290/542* (2013.01); *C10L 2290/548* (2013.01)

(58) Field of Classification Search
CPC .......... B01D 2257/504; B01D 2258/05; B01D 2256/245; B01D 53/226; B01D 53/229; B01D 2257/304; B01D 53/047; B01D 53/225

See application file for complete search history.

(56) References Cited

U.S. PATENT DOCUMENTS 5,401,300 A   3/1995   Lokhandwala et al.
5,661,027 A *   8/1997   Takeuchi ............... B01D 53/84
                                                       435/282

(Continued)

FOREIGN PATENT DOCUMENTS

FR          3019061 A1    10/2015

OTHER PUBLICATIONS

Aita, Bruno C. et al., "Biofiltration of H2S-rich biogas using Acidithiobacillus thiooxidans", Sep. 2015, Clean Techn Environ Policy 18 (3) 689, DOI 10.1007/s10098-015-1043-5.
(Continued)

*Primary Examiner* — Imran Akram
(74) *Attorney, Agent, or Firm* — FORGE IP, PLLC

(57) ABSTRACT

An improved process for removing acid gases from raw biogas streams, such as biogas from landfills or biogas from controlled anaerobic digestion, provides for efficient $H_2S$ removal combined with carbon dioxide removal. The biogas is treated in a biological hydrogen sulfide removal system integrated with a multi-stage membrane gas separation system. The combined system provides for efficient acid gas removal while simultaneously limiting oxygen carryover into the treated product stream by beneficially utilizing oxygen in the biological desulfurization system.

26 Claims, 1 Drawing Sheet

(51) Int. Cl.
  *B01D 53/75* (2006.01)
  *B01D 53/84* (2006.01)
  *B01D 53/86* (2006.01)
  *C10L 3/10* (2006.01)

(56) References Cited

U.S. PATENT DOCUMENTS

| | | | | |
|---|---|---|---|---|
| 6,056,934 | A * | 5/2000 | Carlsen | B01D 53/84 423/DIG. 17 |
| 6,630,011 | B1 * | 10/2003 | Baker | B01D 53/225 95/47 |
| 8,221,524 | B2 | 7/2012 | Mitariten | |
| 8,999,038 | B2 | 4/2015 | Ungerank et al. | |
| 2011/0094378 | A1 * | 4/2011 | Mitariten | C10L 3/101 95/96 |
| 2011/0290111 | A1 * | 12/2011 | Dunne | B01D 53/75 95/51 |
| 2012/0264197 | A1 | 10/2012 | Mitariten | |
| 2012/0276616 | A1 * | 11/2012 | Siegel | C12M 47/18 95/92 |
| 2013/0098242 | A1 * | 4/2013 | Ungerank | C10L 3/104 96/10 |
| 2017/0283292 | A1 * | 10/2017 | Kim | B01D 53/226 |
| 2018/0043304 | A1 * | 2/2018 | Klok | B01D 53/84 |
| 2018/0250627 | A1 * | 9/2018 | Zick | B01D 53/226 |
| 2019/0224617 | A1 * | 7/2019 | Mitariten | B01D 53/228 |
| 2020/0047112 | A1 * | 2/2020 | Chareyre | B01D 53/30 |
| 2020/0179868 | A1 | 6/2020 | Ding | |
| 2020/0188843 | A1 * | 6/2020 | Barraud | B01D 53/228 |
| 2020/0261843 | A1 * | 8/2020 | Barraud | B01D 53/225 |
| 2021/0339189 | A1 | 11/2021 | Winkler | |
| 2023/0114525 | A1 | 4/2023 | Henry | |

OTHER PUBLICATIONS

Anjan K. Datta et al., "Optimization of membrane unit for removing carbon dioxide from natural gas"; Journal of Membrane Science 283 (2006) 291-300.

Dumont, E. "H2S removal from biogas using bioreactors: a review". International Journal of Energy and Environnement, 2015, 6 (5), pp. 479-498.

Li, et al., "Biological technologies for the removal of sulfur containing compounds from waste streams: bioreactors and microbial characteristics"; World J Microbiol Biotechnol (2015), 31 (10) 1501, DOI 10.1007/s11274-015-1915-1.

Makaruk, A. et al. "Membrane biogas upgrading processes for the production of natural gas substitute"; Separation and Purification Technology 74 (2010) pp. 83-92.

Pachaiappana, R. et al., "A review on biofiltration techniques: recent advancements in the removal of volatile organic compounds and heavy metals in the treatment of polluted water"; Bioengineered 2022, vol. 13, No. 4, 8432-8477.

* cited by examiner

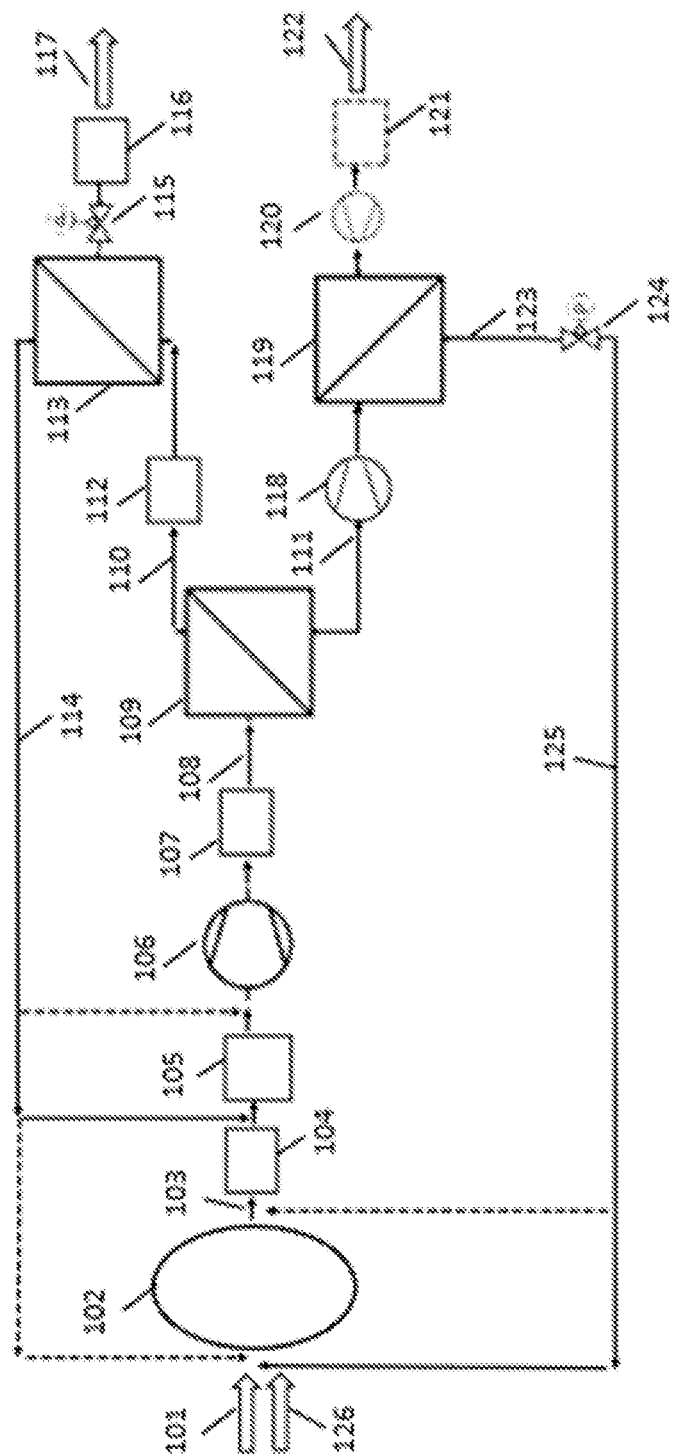

SYSTEM AND METHOD FOR CLEANING OF BIOGAS

FIELD OF THE INVENTION

This invention relates to a system and method for removing acid gases, such as carbon dioxide and hydrogen sulfide, from a range of biogas streams by a membrane purification process combined with a biological removal of hydrogen sulfide.

BACKGROUND OF THE INVENTION

Methane is one of the main components of the primary energy used in the United States. Much of the raw methane-containing gas sources are "subquality," that is, the raw gas exceeds pipeline specifications in carbon dioxide and/or hydrogen sulfide, sometimes nitrogen and oxygen. The gas must be treated to meet pipeline specifications. Renewable natural gas (RNG) generated from biogas is an emerging alternative energy source comprised of methane.

Biogas is obtained by a complex degradation process of organic matter that is performed by a set of bacteria under anaerobic conditions. Biogas is produced from a variety of organic materials in plants ranging from sewage treatment plants to organic waste utilization in landfill sites, to farm biogas production that utilizes ecologically pure crops and manure. The resulting gas consists primarily of methane and carbon dioxide together with smaller amounts of other gases and vapors, such as hydrogen sulfide, ammonia, volatile organic compounds (VOCs), and additionally of siloxanes for landfill and wastewater treatment gas. As shown by a considerable number of biogas plants around the world, biogas production and utilization can result in additional available energy with reduced emission of methane and carbon dioxide to the atmosphere and the production of valuable fertilizer. Several biogas utilization methods can be applied. Presently, the most popular approach is the production of combined heat and power (CHP) by means of internal combustion engines. The CHP process can be deployed if heat consumers are in the vicinity of the plant. However, this requirement cannot be met in most cases. As a result, the excess heat energy is frequently vented into the atmosphere, lowering the overall energy production efficiency and requiring additional electrical power for heat removal. The biogas upgrading to pipeline natural gas quality avoids this shortcoming and generates renewable natural gas (RNG). The upgraded biogas is in the form of a natural gas substitute and can be injected into existent natural gas grids or used as a vehicle fuel using the natural gas infrastructure. The upgraded biogas can be distributed at a low cost and utilized with a higher efficiency by customers. However, to generate renewable natural gas, the raw biogas must be upgraded to pipeline specification by removing multiple impurities, wherein key impurities are hydrogen sulfide and, the largest volumetric impurity component, carbon dioxide.

The biogas contains a variable, but usually high, carbon dioxide content from 25 to 60 volumetric percent. The $H_2S$ concentration in the biogas usually ranges from 10 to 5,000 ppmv but can reach up to 30,000 ppmv (3% v/v) in some cases. To be used as a source of energy to generate heat and/or electricity as renewable natural gas, biogas must be cleaned ($H_2S$ and VOCs removed) and upgraded ($CO_2$ removed to product specification). The raw biogas can further contain oxygen in variable amounts that can require removal to meet pipeline specifications and a significant amount of nitrogen that may require removal as well to meet pipeline specifications for total inert components.

A large fraction of the raw biogas gas streams exceeds the typical acid gas pipeline specification for carbon dioxide of no more than 2% and for hydrogen sulfide below 4 ppm. Since the feed gas may contain other sulfur-based compounds and inert gas nitrogen, the pipeline natural gas typically must contain 0.5 grains of total sulfur or less per 100 cubic feet of gas with total non-hydrocarbons of 4% or less. Before biogas can be sent to the supply pipeline, the carbon dioxide and hydrogen sulfide content must be reduced. Various techniques for acid gas removal, including absorption into water or an amine solution, cryogenic separation, adsorption, and membrane separation, have been used in the industry. Each has its advantages and disadvantages. It is also known to use a combination of these unit separation processes for acid gas removal.

Methods heretofore known for the purification of biogas, in particular, carbon dioxide gas removal, may be divided roughly into the following classifications:

(a) Methods involving absorption separation unit operations, wherein water or amine absorbent-based water solutions or physical solvents are utilized as an absorption media.

(b) Methods involving membrane separation unit operations, wherein the carbon dioxide is removed by preferential permeation through a polymeric membrane.

(c) Methods involving adsorption unit separation operations, wherein the carbon dioxide is removed by a thermal or pressure swing adsorption process. The most common adsorbent is activated carbon but other adsorbents, including zeolites, such as zeolite 5A, molecular sieve carbons, silica gel, activated alumina, or other adsorbents selective for carbon dioxide over methane are utilized as well.

(d) Methods involving liquefaction and cryogenic distillation are utilized when products in a liquified form are desired.

Membrane processes for biogas upgrading have been reviewed by A. Makaruk et al. in Separation and Purification Technology 74 (2010) pp. 83-92.

Membrane units remove carbon dioxide and hydrogen sulfide by selective permeation of acid gases from high pressure to low pressure across a polymeric membrane. Membrane systems have numerous attractive features, such as intrinsic simplicity, the lack of cyclic valve switching, and the ability to generate dry biomethane at elevated pressure. Polymeric membranes can lose treating capacity over time due to exposure to contaminants, such as heavy hydrocarbons, and adsorption processes are commonly used as a pretreatment for the removal of water, heavy hydrocarbons, and other contaminants. The intrinsic simplicity of membrane gas separation processes make them attractive for biogas processing to produce renewable natural gas. However, the efficient removal of carbon dioxide from industrial process streams with a high methane product recovery by membrane processes requires staging. The membrane staging configuration must be optimized toward the specific application. Optimization of membrane units for removing carbon dioxide from natural gas is reviewed by Anjan K. Datta et al. in the Journal of Membrane Science 283 (2006) 291-300. A multistage membrane process for generating high-purity biomethane combined with high recovery from raw biogas is disclosed in U.S. Pat. No. 8,999,038.

Activated carbon adsorbents are effective in $H_2S$ removal, including impregnated carbon adsorbents. Impregnated adsorbent media can be directly reactive via alkali sites or provide a catalytic activation of $H_2S$ oxidation in the presence of oxygen. The latter approach is preferable since it provides for an increase in activated carbon bed longevity and higher $H_2S$ total volume removal capacity. Biogas feed streams frequently contain oxygen. In the presence of oxygen, $H_2S$ is oxidized and deposited in the form of sulfur on the activated carbon. Depending on the front-end fermentation processes, the biogas produced may be too low in oxygen (<0.02% mol) to allow the chemical reaction on the impregnated activated carbons to transform the $H_2S$ into elemental sulfur (S) deposited within the pores of the carbon. In this case, the loading rate of the activated carbons (quantity of adsorbed $H_2S$ relative to the mass of carbon active) is greatly reduced and the life of the activated carbon charge is also reduced. Consequently, the renewal of activated carbons is more frequent and entails additional operating costs. It has been proposed in French Patent Application No. FR3019061A1 to inject air or oxygen into the biogas to increase oxygen concentration and improve $H_2S$ removal efficiency by activated carbon. However, excessive amounts of oxygen or nitrogen may accumulate in the biogas and necessitate downstream removal to meet pipeline specifications.

F. Winkler, in U.S. Patent Application Publication No. US 2021/0339189 A1, discloses a biogas treatment system comprised of an activated carbon $H_2S$ removal adsorbent bed in front of a three-stage membrane system. The oxygen content and relative humidity can be adjusted for the optimum adsorption capacity of the hydrogen sulfide adsorber by recycling permeate from the second membrane separation stage, which receives the retentate of the first membrane separation stage, to a point upstream of the hydrogen sulfide adsorber.

Currently, most of the adsorption-based techniques employed in the removal of $H_2S$ from biogas have a chemical base, with high material costs and secondary pollutant generation. In particular, the hydrogen sulfide removal by adsorption on the activated carbon is associated with the formation of sulfur compounds or sulfur, which deposits in the adsorber and degrades removal efficiency. Treatment of biogas feeds with high concentrations of hydrogen sulfide leads to frequent replacement of the adsorbent and increased costs of both impregnated activated carbon replacement and its disposal. For this reason, it is uneconomical to remove high quantities of hydrogen sulfide by adsorption on activated carbon.

Biological processes for $H_2S$ removal have become effective and economical alternative techniques to traditional gas-treatment systems based on physicochemical methods. The biological processes of $H_2S$ removal are reviewed in the following publications: E. Dumont, "$H_2S$ removal from biogas using bioreactors: a review", International Journal of Energy and Environment, Volume 6, Issue 5, 2015, pp. 479-498; Bruno Carlesso Aita et al., "Biofiltration of $H_2S$-rich biogas using *Acidithiobacillus thiooxidans*", Clean Technology Environmental Policy, 18 (3) 689, DOI 10.1007/s10098-015-1043-5; Lin Li et al., "Biological technologies for the removal of sulfur-containing compounds from waste streams: bioreactors and microbial characteristics", World Journal Microbiology Biotechnology., 31 (10) 1501.

Biological desulfurization technologies are well established and their use for biogas treatment can be generically divided into segments that differ in methods of oxygen introduction and utilization in the bioprocess. Oxygen is the prerequisite to the vital activity of bacteria and to enable $H_2S$ oxidation and removal that proceeds according to the following mechanisms:

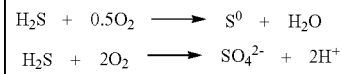

The process proceeds with $H_2S$ oxidation to elemental sulfur and/or sulfuric acid. The oxygen supply and process conditions determine the balance between sulfur and sulfuric acid formation.

The raw biogas produced by anaerobic digestion contains some oxygen in a variable concentration. To enable efficient $H_2S$ removal by a biological process the oxygen concentration must be managed. A low oxygen concentration can lead to incomplete $H_2S$ removal. However, oxygen excess is undesirable since it will accumulate in the product RNG. RNG product specification can vary but pipeline specifications frequently have stringent limits on the residual oxygen content. Excess oxygen is commonly removed by the deoxygenation process, wherein the oxygen is reacted with methane at high temperatures and converted into water vapor and carbon dioxide. The process consumes product methane and necessitates an additional dehydration step to remove water.

M. J. Mitariten, in U.S. Pat. No. 8,221,524, discloses a combined membrane adsorption process wherein the bulk of the carbon dioxide and some of the oxygen are removed from the feed gas by a membrane process followed by a PSA process to remove residual oxygen. The use of a membrane process to remove oxygen from biogas is further described in U.S. Patent Application Publication No. US 2023/0114525 A1. The process applies to biogas streams with limited oxygen content only and the low oxygen removal efficiency leads to a significant methane product loss.

During the biological desulfurization process, hydrogen sulfide is mostly oxidized to sulfuric acid and small quantities of elemental sulfur precipitate, wherein the latter is removed with a water wash. The clogging of the biological treatment system due to the deposit of elemental sulfur $S_0$ and biomass accumulation represents the most common problem in bioprocesses treatment operation and is frequently the result of oxygen imbalance. Injection of supplemental oxygen is frequently required to manage bioprocess treatment operations. This, in turn, increases oxygen content in the treated gas and frequently necessitates downstream oxygen removal to meet pipeline specifications. Atmospheric air can be injected as an oxygen source in some cases which, in turn, increases nitrogen content in the produced biomethane that can exceed pipeline specifications.

It is known to utilize membranes with tailored $H_2S$ removal characteristics in biogas treatment. Y. Ding and M. Mitariten, in U.S. Patent Application Publication No. US 2020/0179868 A1, disclose a biogas treatment process that removes carbon dioxide and hydrogen sulfide from the biogas to generate pipeline specification RNG. Multiple types of membranes with properties tailored to hydrogen sulfide and carbon dioxide removal are utilized to remove acid gases. However, low membrane selectivity limits the range of biogas streams that can be treated to meet pipeline specifications, the process is accompanied by an increase in methane losses, and the hydrogen sulfide removed by membrane processes must be sent to flair leading to significant SOx emissions.

K. A. Lokhandwala et al., in U.S. Pat. No. 5,401,300, titled "Sour Gas Treatment Process Including Dehydration of the Gas Stream," disclose a membrane-based process for hydrogen sulfide removal combined with gas dehydration. However, low membrane selectivity limits the range of biogas streams that can be treated to meet pipeline specifications, the process is accompanied by an increase in methane losses and the hydrogen sulfide removed by the membrane processes must be sent to flair leading to significant SOx emissions.

M. J. Mitariten, in U.S. Patent Application Publication No. US 2012/0264197 A1, titled "$H_2S$ Removal from Contaminated Gases," discloses a process for removing hydrogen sulfide from a raw natural (US) gas stream, such as biogas from landfills or controlled anaerobic digestion. The process comprises passing the natural gas stream through a separation unit, such as a PSA unit, to form a product stream that consists of a high concentration of methane and a low-pressure tail gas containing hydrogen sulfide, passing the tail gas through a biofilter which includes bacteria that degrades the hydrogen sulfide to sulfur and sulfate compounds which are washed from the biofilter. The tail gas stream after the treatment in the biofilter can be flared into the atmosphere without significant SOx emissions.

Within the current state of the art, membrane systems offer significantly lower investment costs and ease of operation. A low membrane selectivity, however, makes it impossible to produce high-purity gases at high recovery in a single-stage process, necessitating multi-membrane staging. State-of-the-art membrane systems are efficient in bulk acid gas removal but are characterized by high electrical power consumption related to recycled gas recompression to attain high product purity with high recovery. The hydrogen sulfide removed by membrane processes as a low-pressure permeate gas is commonly sent to flair leading to significant SOx emissions.

Biological hydrogen sulfide removal systems are efficient but require excess oxygen for efficient operation. This leads to oxygen being retained in the processed stream. Bioreactors can suffer from clogging due to the deposit of elemental sulfur if oxygen availability is limited.

Thus, there is still a need for an improved energy-efficient and lower-cost acid gas removal process from biogas that overcomes the limitations of the prior art.

SUMMARY OF THE INVENTION

The present invention provides an integrated process that combines biological $H_2S$ removal and membrane separation for the removal of acid gases and some oxygen from a broad range of raw biogas streams, including landfill gas and digester gas. A substantial fraction of acid gases, which may include carbon dioxide and hydrogen sulfide, are removed by a combination of biological $H_2S$ removal followed by a multistage membrane system. The individual separation unit operations of the integrated process and their combination are optimized to increase hydrocarbon recovery while removing the bulk of acid gas content to product specification. By combining these two purification technologies, it is possible to remove multiple contaminants at significantly lower operating costs.

Thus, it is an objective of the present invention to combine the biological $H_2S$ removal with a membrane separation process that removes the bulk of the carbon dioxide and reduces the oxygen content of the treated gas simultaneously. A process permeate stream generated by the membrane process enriched in oxygen content is directed to the biological treatment system and is used for beneficial $H_2S$ removal while simultaneously lowering demand for supplemental oxygen injection.

In one embodiment of the invention, the process for the purification of raw biogas stream containing methane, acid gases, and oxygen available at a substantially atmospheric pressure comprises the steps of:

(i) processing a combined feed gas stream comprised of a raw biogas feed stream and at least one recycled permeate gas stream generated by a membrane separation unit and optionally a supplemental oxygen source stream through a biological hydrogen sulfide removal system at a substantially atmospheric pressure, thus generating a first effluent stream with reduced hydrogen sulfide and oxygen content as compared to the combined feed gas stream;

(ii) compressing the first effluent stream in a compressor to a pressure from 6 to 25 barg followed by aftercooling and condensate separation, thereby forming a second effluent stream;

(iii) passing the second effluent stream into a first membrane separation unit, wherein a first membrane removes a portion of oxygen and carbon dioxide from the second effluent stream, thereby forming a retentate third effluent stream having a reduced content of carbon dioxide as compared to the second effluent stream and a permeate fourth effluent stream enriched in oxygen and carbon dioxide as compared to the second effluent stream;

(iv) passing the third effluent stream to a second membrane separation unit, wherein a second membrane removes a portion of carbon dioxide and oxygen from the third effluent stream, thereby forming a retentate fifth effluent stream having a lower carbon dioxide and oxygen content as compared to the third effluent stream and a permeate sixth effluent stream enriched in carbon dioxide and oxygen content as compared to the third effluent stream;

(v) passing the fourth effluent stream to a third membrane separation unit wherein a third membrane removes a portion of carbon dioxide and oxygen from the fourth effluent stream, thereby forming a retentate seventh effluent stream having a lower carbon dioxide content as compared to the fourth effluent stream and a higher oxygen content as compared to the raw biogas feed stream and a permeate eighth effluent stream with a carbon dioxide concentration above 95 volumetric percent, wherein the eighth effluent stream is at substantially atmospheric pressure or a sub-atmospheric pressure;

(vi) wherein the sixth effluent stream is recycled and combined with the raw biogas feed stream in step (i) or wherein the sixth effluent stream is recycled and combined with the first effluent stream to define the second effluent stream;

(vii) wherein the seventh effluent stream is comprised of the recycled gas stream combined with the raw biogas feed stream in step (i); and (viii) collecting the fifth effluent stream generated by the second membrane generation unit as a product, wherein the fifth effluent stream has an increased methane content and reduced hydrogen sulfide, oxygen and carbon dioxide content as compared to the raw biogas feed stream.

In some embodiments, the eighth effluent stream generated by the third membrane separation unit, comprised primarily of carbon dioxide, is collected as a product.

Raw biogas feeds can contain variable concentrations of oxygen and the oxygen concentration can vary over time. Frequently, the oxygen concentration is below 0.5%. This can lead to incomplete hydrogen sulfide removal. To enable efficient hydrogen sulfide removal a controlled amount of supplemental oxygen must be injected to convert hydrogen sulfide into elemental sulfur and sulfuric acid. The need for oxygen injection can be eliminated, or the supplemental oxygen amount can be reduced, by feeding the sixth and/or seventh effluent stream or both, generated by the membrane system, into the biological treatment unit. The sixth and seventh effluent streams contain oxygen concentrations above that of the raw feed biogas stream. The membrane system is beneficial by removing oxygen from the process stream and by providing a source of needed oxygen to the biological hydrogen sulfide removal system.

To manage the oxygen content in the biological desulfurization process at least the sixth effluent stream or at least a portion of the seventh effluent stream, or both the sixth effluent stream and the seventh effluent stream, are combined with the raw biogas feed stream in step (i). To reduce energy consumption the combined volumes of the sixth and seventh effluent streams should be adjusted to supply the amount of oxygen needed to affect $H_2S$ removal in the biological desulfurization unit, while minimizing the recycle volumes. The permeate and retentate gas volumes are controlled by controlling the membrane stage cut (the ratio of permeate to feed flow volumes). The stage cut should not be reduced, however, in each stage below values that are needed to attain the carbon dioxide product purity.

The seventh effluent stream has the highest oxygen concentration and the lowest volume as compared to the sixth effluent stream recycle stream. To minimize energy consumption by reducing recycled gas volume it is preferable to mix the seventh effluent stream with the raw biogas to be recycled to the biological desulfurization unit.

It is within the scope of the invention to deploy an adsorption desulfurization unit downstream of the biological desulfurization unit to further reduce the concentration of hydrogen sulfide. Preferred adsorbents include impregnated activated carbons characterized by catalytic activity for the oxidation of hydrogen sulfide in the presence of oxygen. To improve the efficiency of the activated carbon adsorption unit operation the sixth effluent stream is preferably mixed with the first effluent stream upstream of the adsorption unit to manage water vapor content while providing oxygen needed for the operation of the adsorption unit. The sixth effluent stream exhibits a relatively low water vapor content and thus is beneficial in reducing feed gas dew point directed into the adsorption unit. It is also within the scope of the invention to position the supplemental $H_2S$ removal adsorption unit following the first effluent stream compression. If the water vapor concentration of the first or second effluent stream is excessively high for efficient operation of the system, which can include compression, adsorption, or membrane operations, then the first effluent stream and/or the second effluent stream is treated to remove access water upstream of the adsorption unit.

To generate RNG that meets pipeline or customer product specifications, such as LNG or CNG, the fifth effluent stream can be treated further to reduce carbon dioxide concentration and/or remove additional impurities. This additional treatment may include processing the fifth effluent stream alternatively in an additional membrane separation unit, in an adsorption unit (including a pressure swing adsorption unit), or in an absorption unit. The permeate gas generated by the additional membrane unit and/or the blow-off gas generated by the PSA unit is recycled to the front end of the compressor to increase methane recovery.

Some product specifications, including pipeline specifications, have low oxygen content requirements that necessitate supplemental oxygen removal. In some embodiments of the invention, the third or the fifth effluent stream is treated to remove residual oxygen in an oxygen removal system, such as the deoxo system, before being directed for utilization of further processing. The fifth effluent stream treated in the deoxygenation unit requires aftercooling, followed by condensate separation, and dehydration to remove water generated by the deoxo process. Treating the third effluent stream in a deoxygenation unit provides certain benefits since the thus processed stream will be treated in a second membrane unit that will remove water vapors generated by the deoxo process, negating the need for a dehydration unit. Before introducing the gas into the second membrane unit, the gas must be cooled, condensate removed, and the gas superheated to protect the second membrane unit from damage. In this embodiment, the sixth effluent stream does not contain beneficial oxygen and thus is recycled to the front end of the compressor directly.

To meet product specifications for the total concentration of inert components and heating value excess nitrogen must be removed in some cases from the product gas. In such embodiments of the invention, the fifth effluent stream is treated to reject excessive nitrogen concentration in a nitrogen rejection system (NRU) before being directed for utilization or further processing.

The system separation efficiency can be improved by utilizing pressure boosting via the use of blowers or by deploying vacuum pumps to reduce pressure on the membrane permeate side. Pressure boosting and application of vacuum increases the pressure ratio across the membrane with a concomitant increase in separation efficiency and productivity. To increase the membrane separation efficiency a compressor or a gas blower can be positioned between the first membrane separation unit and the third membrane separation. It is further within the scope of the invention to decrease the permeate pressure of the third membrane unit to a sub-atmospheric level via the use of a vacuum pump.

The hydrogen sulfide concentration in the eight-effluent stream may exceed specifications acceptable for dispersion into the atmosphere or further utilization. The stream is thus further treated in an additional desulfurization unit to remove the remaining hydrogen sulfide.

In some cases, the oxygen concentration in the feed biogas stream may be low to enable efficient operation of the biological oxygen removal unit. In these cases, supplemental oxygen injection may be required to enable $H_2S$ removal. The excess oxygen from the gas treated by the biological $H_2S$ removal unit is at least partially removed by the subsequent treatment of the gas in the membrane system and recycled into the biological treatment unit for beneficial utilization.

The membrane separation units are equipped with polymeric membranes that permeate individual gas components at different rates affecting gas separation. The sixth effluent stream and the seventh effluent stream are enriched in oxygen content as compared to the oxygen concentration in raw biogas due to the preferential oxygen permeation through the polymeric membrane as compared to methane permeation. For the most efficient separation of oxygen and carbon dioxide from methane by permeation, the polymeric membrane in the first membrane separation unit and the polymeric membrane in the third membrane separation unit exhibit an oxygen/methane separation factor of 5 or above, and a carbon dioxide/methane separation factor of 25 or above, more preferably oxygen/methane separation factor of 6 or above, and more preferably a carbon dioxide/methane separation factor of 40 or above as measured at room temperature conditions. For the most efficient separation of oxygen and carbon dioxide from methane by permeation, the membrane in the second membrane separation unit is a polymeric membrane with an oxygen/methane separation factor of 5 or above, more preferably 6 or above, and a carbon dioxide/methane separation factor of 20 or above, more preferably 25 or above.

The above and other features of the invention, including various novel details of construction and combinations of parts, and other advantages, will now be more particularly described with reference to the accompanying FIGURE and pointed out in the claims. It will be understood that the particular methods and articles embodying the invention are shown by way of illustration and not as a limitation of the invention. The principles and features of this invention may be employed in various and numerous embodiments without departing from the scope of the invention.

BRIEF DESCRIPTION OF THE DRAWING

The FIGURE is a schematic drawing of an exemplary embodiment of the process of the invention, wherein low-pressure biogas containing acid gases is treated in a system comprised of a biological hydrogen sulfide removal unit, an adsorption unit designed to remove residual hydrogen sulfide, a compressor, refrigeration units to adjust the water vapor dew point of the gas directed into the intake of the adsorption unit positioned in front of the compressor and following the compression, and a three-stage membrane unit that removes a fraction of carbon dioxide and some oxygen.

DETAILED DESCRIPTION OF EXEMPLARY EMBODIMENTS

In accordance with the illustrated exemplary embodiment, the permeate stream from the second membrane separation unit, enriched in oxygen content as compared to the oxygen content in the feed raw biogas, is recycled upstream of the adsorption hydrogen sulfide removal unit and combined with substantially desulfurized and dehydrated gas processed by the biological desulfurization unit before combined gas volumes are compressed and processed in the multi-stage membrane system. The permeate gas stream addition is beneficial to the adsorption unit $H_2S$ removal system's operation by lowering the feed gas water dew point and by providing supplemental oxygen, both providing betterment to the performance of the activated carbon adsorbent. In some embodiments, the entire volume of the permeate generated by the second separation unit is directed to the front end of the biological desulfurization unit to provide additional supplemental oxygen for biological unit operation. In some embodiments, wherein supplemental oxygen use by permeate stream from the second separation unit is not required for the operation of biological and adsorption $H_2S$ removal units, the permeate generated by the second membrane separation unit is directed to the front end of the compressor.

The retentate stream generated by the third membrane separation unit is enriched in oxygen content and is recycled upstream of the biological hydrogen sulfide treatment unit, where the oxygen is beneficially utilized in the $H_2S$ removal process. In some embodiments, a fraction of the retentate stream is recycled and combined with the treated effluent stream generated by the biological desulfurization unit to aid in the operation of the supplemental adsorption unit.

If the initial oxygen content of the raw feed biogas is insufficient for efficient biological desulfurization unit operation, a controlled amount of supplemental oxygen is injected in addition to the recycled permeate and retentate streams. The need for any supplemental oxygen injection is not needed if the oxygen content of the raw feed biogas is sufficiently high for efficient biological $H_2S$ removal system operation.

In some embodiments, an optional deoxygenation, deoxo, unit is further deployed to reduce RNG product oxygen content for low oxygen content product specification. The deoxo unit can be positioned between the first and second stages or on the retentate product line of the second stage. In the latter position, the deoxo unit must be followed by condensate removal and dehydration to meet pipeline specifications for water vapor content. If the deoxo unit is positioned between the first and second membrane separation units, the permeate stream generated by the second separation unit is recycled directly to the front end of the compressor.

The method of the present invention provides an improved process of producing a product methane stream from biogas with a reduced acid gas ($CO_2$ and $H_2S$) and oxygen content. The acid gases are removed by a combination of a biological hydrogen sulfide removal system followed by a membrane separation process. The biological hydrogen sulfide removal system provides for the initial substantial hydrogen sulfide removal and consumes some oxygen in the process. Following $H_2S$ removal by the biological process, the treated gas water vapor dew point is reduced, preferably in a refrigerator dehumidifier, compressed, and treated in a multi-stage membrane system for the simultaneous removal of carbon dioxide and oxygen. The membrane system serves multiple functions—it removes undesirable carbon dioxide and oxygen from the conditioned biogas stream. At least a fraction of the gas streams generated by the membrane system enriched in oxygen content as compared to the oxygen concentration in the feed raw biogas is recycled to the biological hydrogen sulfide treatment unit to aid in biological activity.

The carbon dioxide concentration of the raw biogas varies from above 25% to as high as 60%, more commonly from 30% to 55%. The carbon dioxide must be removed, and the caloric value of the product gas increased, before gas utilization for direct heat and power generation or for injecting the RNG product into the distribution grid. The biogas treated by the biological $H_2S$ removal system is compressed and treated in a multi-stage acid gas and oxygen removal system. The carbon dioxide concentration must be reduced to meet the local pipeline specification, which can vary from 5% to 2% mol. The retentate gas generated by the second membrane system may still contain an excess of carbon dioxide and thus is treated in an additional membrane stage. Alternatively, the excess carbon dioxide is removed by an absorption or an adsorption system.

The anaerobic digestion of organic matter does not introduce oxygen into the biogas. Oxygen presence is commonly caused by air introduction with biomass loading and is affected by the loading process. For biogas from agricultural waste digesters, oxygen concentrations commonly are lower than 0.5%. For landfill gas, the concentrations of oxygen in the biogas can be as high as 5% due to difficulty in landfill hermitization.

Some biogas may contain a significant concentration of inert impurities, such as nitrogen. The product gas carbon dioxide concentration may need to be reduced further (below 2% pipeline specification) to meet the pipeline's total inert gas concentration limit. The excess nitrogen is removed in a post-purification step via a membrane or pressure swing adsorption (PSA) system.

The raw biogas stream typically contains a significant amount of hydrogen sulfide and other sulfur-containing impurities that must be removed to meet customer product specifications. The hydrogen sulfide concentration can be as low as 10 ppm or as high as 3% for some biogas streams. The content of hydrogen sulfide in biogas depends on the raw materials used, the fermentation process methodology, and the fermentation process protocol. In some cases, for example, during the fermentation of bioethanol production waste (vinasse), the hydrogen sulfide content can reach up to 30,000 ppmv. The biological desulfurization process can reduce the content of hydrogen sulfide in the processed biogas economically to about 100 ppmv or slightly below. The further reduction in hydrogen sulfide concentration is most economically accomplished by utilizing adsorption methodology. To meet the pipeline natural gas specification the concentration of impurities must be reduced to a typical pipeline specification of hydrogen sulfide: 0.25-0.3 g/100 scf (6-7 mg/m$^3$); total sulfur: 5-20 g/100 scf (115-460 mg/m$^3$); water vapor: 4.0-7.0 lb/MM scf (60-110 mg/m$^3$), and oxygen: 1.0% or less with total non-hydrocarbons content of 2% or less. The product specifications for the methane to be converted into liquified natural gas (LNG) are more stringent. Typical requirements for the liquifying purposes: hydrogen sulfide concentration 1 ppmv; water vapor concentration 1 ppmv; and carbon dioxide concentration 50 ppmv.

Direct use of the biogas in energy generation is limited due to the presence of hydrogen sulfide ($H_2S$). Most of the conventional techniques employed in the removal of $H_2S$ have a chemical base, with high material costs and secondary pollutant generation. Biological processes for $H_2S$ removal have become effective and economical alternative techniques to traditional gas-treatment systems based on physicochemical techniques. Biological hydrogen sulfide removal is an efficient method of biogas treatment. It is largely known that the most appropriate bacterial species for biogas purification are the chemoautotrophic bacteria. Several chemoautotrophic bacteria are suitable for the biodegradation of $H_2S$. These bacteria grow and produce a new cellular material using inorganic carbon ($CO_2$) as a source of carbon and obtain chemical energy from the oxidation of inorganic compounds, such as $H_2S$. Among the chemoautotrophic bacteria, the sulfur-oxidizing bacteria, such as *Thiobacillus, Acidithiobacillus, Achromatium, Beggiatoa, Thiothrix, Thioplaca, Thiomicrospira, Thiosphaera, Thermothrix*, and others, are utilized. Bacteria of the genus *Thiobacillus* or *Acidithiobacillus* are the most suitable for the treatment of gases containing $H_2S$ because they require fewer nutrients and have optimum activity in the acidic pH. The main characteristics that the bacteria should have are the following: the ability to convert $H_2S$ to $S_0$ and preferably to $H_2SO_4$; low nutrient requirement; easiness in the separation of $S_0$ and $H_2SO_4$ from biomass; low biomass accumulation; and high resistance to fluctuations in pH, temperature, moisture, polluting load, and $O_2$ demand.

Oxygen is the critical enabling component in hydrogen sulfide oxidation and removal. Oxygen is the prerequisite to enable $H_2S$ oxidation and removal and proceeds according to the following mechanisms:

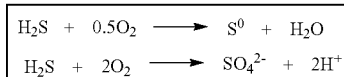

The process proceeds with $H_2S$ oxidation to elemental sulfur and/or sulfuric acid. The oxygen supply and process conditions determine the balance between sulfur and sulfuric acid formation. However, the raw biogas frequently contains insufficient and/or fluctuating oxygen content that requires a supplemental oxygen injection. The process of the instant invention provides for improved management of oxygen in the biological desulfurization process by combining biological hydrogen sulfide removal with a membrane gas separation process. The membrane system serves multiple functions—it removes undesirable carbon dioxide and excess oxygen from the processed biogas stream while directing the removed oxygen back into the biological treatment unit. The oxygen supply to the biological desulphurization unit by the method of the invention consists of the initial oxygen contained in the biogas, the recycled gas stream enriched in oxygen content generated by the membrane system, and supplemental oxygen from an external oxygen source added on needs bases. The recycle membrane streams reduce the need for external oxygen addition and, in some cases, the need for oxygen addition is eliminated.

Raw biogas is commonly available at substantially atmospheric pressure. The pressure of the raw biogas may be increased by way of a gas blower prior to being fed into the biological treatment unit, but typically will not exceed 0.5 barg. Certain gas impurities can be removed before the biological treatment. In one example, the ammonia present in the biogas is removed by way of a water wash prior to the biogas being treated in the biological hydrogen sulfide removal unit. Some raw biogas streams contain a significant amount of ammonia that is commonly removed upstream of the acid gas removal steps. For intensification of upstream ammonia removal, the sour wastewater from the biological desulfurization process can be used in the ammonia removal process since ammonia reacts with sulfuric acid to form ammonium salts.

The gas is processed at a low pressure in the biological hydrogen sulfide removal unit and must be compressed before the gas is treated in membrane systems by the method of the invention. The raw feed gas is treated in the biological hydrogen sulfide removal unit prior to compression. The raw feed gas is compressed to a pressure from about 6 barg to about 25 barg prior to being treated by the method of the invention in the membrane separation units.

The feed biogas is usually saturated with water vapor. The water vapor content must be reduced to ensure the reliable operation of the compression equipment. The water vapor pressure must be reduced as well for the first stage of the membrane separation system and to ensure reliable operation of the adsorption hydrogen sulfide removal unit that utilizes impregnated activated carbon adsorbent for the final hydrogen sulfide removal step. The water dew point control of the product retentate gas generated by the membrane system usually is not required. Membranes act as efficient gas dehydrators due to the high water vapor permeability through polymeric gas separation membranes. However, a supplemental dehydration step of the product gas may be required if additional water is generated during the deoxygenation step carried out to reduce oxygen product concentration further or if the product gas is sent for liquefaction.

The raw feed biogas can further contain several additional impurities in variable concentrations that must be removed before the gas is treated by membrane units before and/or following compression. These impurities may include siloxanes and volatile organic hydrocarbons, among others. These impurities are removed by methods well-known in the art and can include adsorption by activated carbon. It is also within the scope of the invention to remove some impurities prior to compression while removing the rest of the impurities following compression.

The membrane separation units are comprised of one or more membrane separation modules arranged in series or in parallel. The modules are equipped with semipermeable polymeric hollow fiber membranes exhibiting a $CO_2/CH_4$ gas separation factor above 20, preferably above 30, and most preferably above 40, and an oxygen/methane separation factor above 5, preferably above 6, and most preferably above 7. The gas separation factors are defined as a ratio of pure gas permeances at room temperature conditions. The gas separation efficiency is affected by the pressure ratio, i.e., the feed gas to the permeate gas pressure. To maintain high separation efficiency, the permeate gas from the third membrane separation unit is optionally collected at low pressure, i.e., at atmospheric or sub-atmospheric pressure. The feed pressure delivered to third membrane separation unit can be further increased by a booster to improve separation efficiency. The increase in membrane separation efficiency enables membrane operation at a lower stage cut while attaining target purity, which increases product recovery and/or energy efficiency by reducing compression requirements.

It is further within the scope of the invention to deploy membranes with different gas separation characteristics in the first, second, and third membrane separation units. The first membrane separation unit is configured to remove carbon dioxide and some oxygen into the permeate gas stream directed for further processing into the third membrane separation unit and generating a retentate gas stream with reduced carbon dioxide concentration directed for further processing into the second membrane separation unit. In some embodiments, the permeate side gas pressure is adjusted by a valve positioned downstream of the permeate conduit. The first membrane separation unit is equipped with gas separation membranes that exhibit an $O_2/CH_4$ gas separation factor above 5 and a $CO_2/CH_4$ gas separation factor above 25, preferably an $O_2/CH_4$ gas separation factor above 6 and a $CO_2/CH_4$ gas separation factor above 30, and most preferably an $O_2/CH_4$ gas separation factor above 7 and a $CO_2/CH_4$ gas separation factor above 40. The second stage membrane separation unit is configured to concentrate $O_2$ in the low-pressure permeate stream while simultaneously removing carbon dioxide, wherein the permeate stream is directed into the biological hydrogen sulfide removal unit. The second membrane separation unit is equipped with gas separation membranes that preferably exhibit an $O_2/CH_4$ gas separation factor above 5 and a $CO_2/CH_4$ gas separation factor above 20, preferably an $O_2/CH_4$ gas separation factor above 6 and a $CO_2/CH_4$ gas separation factor above 30, and most preferably an $O_2/CH_4$ gas separation factor above 7 and a $CO_2/CH_4$ gas separation factor above 40. In some embodiments, it is preferable to equip the second separation membrane unit with lower gas separation characteristics, but with a much higher gas permeance to reduce capital expenditures related to membrane module installation. The third membrane separation unit is configured to concentrate oxygen and methane in the retentate stream directed into the biological hydrogen sulfide removal unit while concentrating carbon dioxide in the gas permeation stream. The third membrane separation unit is equipped with gas separation membranes that exhibit an $O_2/CH_4$ gas separation factor above 6 and a $CO_2/CH_4$ gas separation factor above 30, and preferably an $O_2/CH_4$ gas separation factor above 7 and a $CO_2/CH_4$ gas separation factor above 40. The gas separation factors are defined as a ratio of pure gas permeances at room temperature conditions.

The operating temperature of each membrane stage may be the same or different to optimize the overall separation efficiency. The gas may be preheated or cooled between stages to control the temperature. The feed gas pressure to the third membrane separation unit can be further boosted by utilizing an interstage pressure booster.

The membrane modules preferably operate in a counter-current mode to increase separation thermodynamic efficiency and reduce methane loss. Each module has a polymeric hollow fiber membrane with a defined high-pressure side and a low-pressure side, and each module has an inlet port connected to the high-pressure side, a retentate outlet port, and a permeate outlet port, therein the retentate outlet port providing an outlet for gas on the high-pressure side, and the permeate outlet port providing an outlet for gas on the low-pressure side. The feed gas is conveyed into the inlet port, the retentate gas is conveyed from the retentate outlet port, and the permeate gas is conveyed from the permeate port.

The fraction of the feed gas conveyed to the membrane permeate side is controlled by a valve positioned on the retentate line to affect retentate product purity and volume. The ratio of the permeate gas volume to the feed gas volume (the stage cut) controlled by a valve positioned on the retentate line can be the same for all membrane separation stages or different. The retentate valves are used to control the stage cut of membrane units that, in turn, control the concentration of oxygen and carbon dioxide in the retentate product streams. The first and second membrane separation units are arranged sequentially wherein the retentate of the first unit serves as a feed gas to the second membrane unit, the stage cuts are determined by one valve positioned on the retentate line downstream of the second membrane unit, and the membrane surface area in each membrane stage. The temperature control of the inlet gas flows of stages 2 and 3 is used to more accurately adjust the permeability due to the dependence of permeability on temperature. The retentate flow volume and purity for the third membrane separation stage are controlled by a valve positioned on the retentate line in combination with the third membrane separation unit's surface area adjustment. The valve settings control the gas recycle volume of the second membrane stage permeate and the third membrane stage retentate, respectively.

The retentate stream of the third membrane separation unit and the permeate stream of the second membrane separation unit are enriched in oxygen content and are at least partly recycled to the biological hydrogen sulfide removal unit to aid in desulfurization, where applicable. However, the oxygen concentration in the biological hydrogen sulfide removal unit in some cases may be still below the optimal concentration required for efficient hydrogen sulfide removal. The supplemental oxygen-containing gas is injected into the biological desulfurization unit to facilitate hydrogen sulfide removal in case of deficiency. The supplemental oxygen can be supplied by an oxygen concentrator with the overall amount of oxygen injection controlled by measuring the oxygen concentration of the first effluent stream at the exit from the biological desulfurization unit.

The methane product stream treated by the combination of the biological hydrogen sulfide removal unit combined with membrane separation units may contain a hydrogen sulfide concentration above the product specification. The gas may be treated in an additional adsorption unit to further reduce the hydrogen sulfide concentration. Thus, the thirst effluent product stream can be further treated in the adsorption $H_2S$ removal unit. Alternatively, the adsorption $H_2S$ removal unit may be used to treat the second effluent stream by positioning the adsorption unit in front of the first membrane separation unit following gas compression. The adsorption unit can be equipped with activated carbon and impregnated activated carbon materials utilized for $H_2S$ removal well known in the art.

The carbon dioxide-based gas stream removed by the membrane system by permeation may contain residual hydrogen sulfide. The hydrogen sulfide concentration can be above the emission standards for the gas to be dispersed in the atmosphere. The hydrogen sulfide concentration in the permeate stream can be above product specification for the carbon dioxide to be utilized as a product. The gas may be further treated in an additional adsorption unit to remove excess $H_2S$ to a target product specification.

The biogas treated by the combination of the biological hydrogen sulfide removal unit and the membrane system may generate a product with oxygen content above the product specification. Additional oxygen removal may be required to meet pipeline specifications. Oxygen removal can be further carried out utilizing a thermal or catalytic deoxidizer unit.

The required oxygen content for an efficient $H_2S$ removal in the incoming gas by a biological process is typically above 0.5%. The average oxygen concentration of the combined blended feed gas to the biological desulfurization unit is 0.6% (mol.), which is sufficient for $H_2S$ removal and support of bacteria vitality. Following the biological desulfurization process the oxygen concentration in the first effluent stream (103) is decreased to 0.5% (mol.), which is a result of oxygen consumption by the biological process.

The average oxygen concentration in the bioreactor is controlled and maintained at a constant level. The oxygen concentration in the first effluent gas stream at the outlet of the biological desulfurization unit is measured continuously and the oxygen concentration is adjusted by the control system by adjusting the supply of the supplemental oxygen injected. To ensure an acceptable level of acidity and uninterrupted removal of the hydrogen sulfide oxidation products, 0.25 m³/h of water is supplied to the biological desulphurization system, and the runoff water containing the dissolved sulfuric acid and small amounts of suspended elemental sulfur is discharged. Supplemental heat is provided as needed to maintain bioreactor operation at a constant 35° C. temperature.

In one example with reference to the FIGURE, the feed raw biogas (101) with an initial $CO_2$ content of 41.95% (mol.), hydrogen sulfide concentration of 500 ppmv, nitrogen concentration 1.5% (mol.), oxygen concentration 0.3% (mol.), and balance methane, and a volumetric flow of 1000 m³/h at normal conditions on dry basis which corresponds to 1180 m³/h of wet gas is treated by the process of the instant invention to remove hydrogen sulfide, carbon dioxide and a fraction of the oxygen. The feed biogas stream (101) is combined with the recycle stream (125) from the third membrane separation unit (119) to generate a feed flow of 1211.6 m³/h to the intake of the biological hydrogen sulfide removal unit (102). A supplemental oxygen-containing gas stream of the following composition—90% oxygen and 10% nitrogen with a volumetric flow of 1.7 m³/h (126)—is added to the gas mixture to manage oxygen content above 0.5% in the incoming gas to the biological desulfurization unit (102) that is required for proper biological process operating conditions. The oxygen concentration is continuously measured at the outlet of the biological desulfurization unit (102) and the supplement oxygen addition is managed by a control system that adjusts the supply of the additional oxygen. The resulting average concentration of the oxygen in the incoming feed gas to the biological desulfurization unit (102) is 0.6% (mol.) which is sufficient for $H_2S$ removal and support of bacteria vitality. To ensure an acceptable level of acidity and removal of hydrogen sulfide oxidation products, 0.25 m³/h of water is supplied to the biological desulphurization system and acidic water runoff with dissolved sulfuric acid and a small amount of elemental sulfur suspension is discharged. As necessary supplemental heat is provided to the bioreactor to maintain the temperature at about 35° C.

In an alternative embodiment, to improve oxygen utilization the sixth effluent stream (114) is recycled and combined with the raw gas stream (101) upstream of the biological desulfurization unit (102).

The average hydrogen sulfide content in the first effluent stream (103) that exits the biological desulfurization unit is 25 ppmv and can vary from 10 to 50 ppmv depending on the biogas feed flow volume and composition and fluctuations in the biological activity of the bioreactor.

The first effluent stream (103) generated by the biological desulfurization unit (102) has a volumetric gas flow of 1198 m³/h and is saturated with water vapor at a temperature of 35° C. The water vapor concentration of the first effluent stream (103) is reduced in a refrigeration unit (104) by cooling the gas to 10° C. followed by condensate water separation. The resulting gas flow volume after dehumidifying is 1146 m³/h.

The first effluent stream (103) with the reduced water vapor content is treated further in an additional adsorption hydrogen sulfide removal unit (105) to reduce $H_2S$ content to 5 ppmv. The adsorption unit (105) is equipped with activated carbon impregnated with a substance that is characterized by catalytic activity toward the oxidation of hydrogen sulfide in the presence of oxygen. The first effluent stream exiting the refrigeration unit (104) is combined with the sixth effluent stream (114) prior to being directed to the adsorption unit (105). The sixth effluent stream (114) exhibits an elevated oxygen content of 1.59% (mol.) that increases the oxygen content in the combined stream to 0.72% (mol.) which, in turn, increases the operational capacity of the impregnated activated carbon. The relatively dry sixth effluent stream (114) additionally decreases the water vapor dew point to +8° C. and protects activated carbon impregnation from washout in the event of refrigeration unit failure.

The sixth effluent stream (114) is added to the intake of the compressor (106) downstream of the adsorption unit (105) directly if the adsorbent material utilized in the adsorption unit (105) does not benefit from oxygen addition.

To reduce $H_2S$ concentration in the eighth effluent stream (122) before dispersion in the atmosphere or for further utilization as a product, the gas is optionally treated in a desulfurization unit (121).

The first effluent stream following desulfurization and dehydration is directed to the intake of the compressor (106) and compressed to 13.2 barg, the compressed gas is treated in an aftercooler to reduce the temperature to 36° C. with subsequent condensate removal.

The water vapor concentration of the compressed gas is reduced in a refrigeration unit (107) to improve the working conditions of the first membrane separation unit (109). The gas is cooled to 10° C. temperature followed by condensed water separation and further superheated to 20° C. thus forming the second effluent stream (108). It is also within the scope of the invention to deploy an adsorption unit to remove contaminants that can be harmful to the membrane unit operation following the water vapor conditioning step (not shown).

The second effluent stream (108) with the following gas composition: $CO_2$ content of 44.66% (mol.), nitrogen content of 2.04% (mol.), oxygen content of 0.73% (mol.), hydrogen sulfide concentration of 5 ppmv, water vapor content of 0.1% and balance methane, and a volumetric flow of 1406 m$^3$/h, is treated in the first membrane separation unit (109) to remove carbon dioxide and partially oxygen, thus forming the third retentate effluent stream (110) of a reduced $CO_2$ content and the fourth permeate effluent stream (111) enriched in $CO_2$ and oxygen content. The third retentate effluent stream (110) has the following gas composition: carbon dioxide 14.41% (mol.), nitrogen 3.04% (mol.), oxygen 0.636% (mol.), hydrogen sulfide concentration of 3 ppmv, water vapor concentration 100 ppmv and balance methane with a volumetric flow of 857.8 m$^3$/h. The fourth permeate effluent stream (111) composition is as follows—carbon dioxide 91.97% (mol.), nitrogen 0.48% (mol.), oxygen of 0.873% (mol.), water vapor 0.24% (mol.), hydrogen sulfide concentration of 9 ppmv, and balance methane with a volumetric flow of 548.4 m$^3$/h and pressure 0.5 barg.

The fourth effluent stream (111) is directed to the intake of the interstage compressor (118) and compressed to 3.5 barg pressure and the temperature is adjusted to 35° C. before the fourth effluent stream (111) is directed to the third membrane separation stage (119).

In some alternate embodiments, the fourth effluent stream (111) is directed to the third membrane stage (119) without interstage pressure boosting. In some embodiments, the separation efficiency is increased via the addition of a vacuum pump (120) to reduce the permeate pressure of the third membrane separation unit (119) and thus increase the pressure ratio across the membrane. The eighth effluent stream (122) is thus collected at a sub-atmospheric pressure. The increase of the separation efficiency of the third membrane separation stage (119) via an increase in pressure ratio can be accomplished via interstage pressure boosting, application of vacuum to the membrane permeate side, or both.

The fourth effluent stream (111) following compression, aftercooling, and condensate removal is treated in the third membrane separation unit (119) to remove carbon dioxide and partly oxygen thus forming the seventh retentate effluent stream (123) of a reduced $CO_2$ content and a higher oxygen content and the eight permeate effluent stream (122) enriched in $CO_2$ and depleted in oxygen and methane. The seventh retentate effluent stream (123) has the following gas composition: carbon dioxide 71.23% (mol.), nitrogen 1.78% (mol.), oxygen 1.79% (mol.), hydrogen sulfide concentration of 10 ppmv, water vapor concentration of 124 ppm and balance methane at a volumetric flow of 131.6 m$^3$/h. The eight permeate effluent stream (122) has the following gas composition: carbon dioxide 98.52% (mol.), nitrogen 0.07% (mol.), oxygen 0.585% (mol.), water vapor 0.29% (mol.), hydrogen sulfide concentration of 8 ppmv, and balance methane (0.526%) at a volumetric flow of 416.8 m$^3$/h and substantially atmospheric pressure.

The eighth permeate effluent stream (122) is sent for atmospheric dispersion or is collected as a product. In some embodiments, an additional adsorption-based desulfurization unit (121) is installed to treat the eighth effluent stream (122) for comprehensive desulfurization of the gas prior to the gas being dispersed in the atmosphere or utilized as a product.

The control valve (124) is used for the third membrane unit's stage cut control, to manage methane and/or oxygen content in the eighth permeate effluent stream (122). The valve is algorithmically opened to decrease the volume of the eighth effluent stream (122) or incrementally closed to increase the volume of the eighth effluent stream (122) thus regulating the stage cut of the third membrane unit operation and the eighth effluent stream's methane and oxygen concentration. The temperature control of the fourth effluent stream (111) following the stream's compression in the interstage compressor (118) is used as a further means of stage cut control since the gas permeance of individual components of the gas mixture is temperature dependent. For turndown management, a part of the third membrane unit surface area is switched off.

The seventh effluent stream (123) generated by the third membrane separation unit (119) is recovered at the pressure of 3 barg. The control valve (124) provides pressure reduction and flow control to form the recycle stream (125). The pressure reduction can be beneficially utilized as a driving force for auxiliary consumer equipment such as pumps and ejectors.

The third retentate effluent stream (110) is directed to and treated in the second membrane separation unit (113) that generates the retentate fifth effluent stream (117) and the sixth permeate effluent stream (114). The third retentate stream's (110) temperature is adjusted to 28° C. before entering the second membrane separation unit (113). The temperature increase is beneficial in reducing the required membrane area of the stage. The fifth effluent permeate stream (117) is collected at pressure as a product at the product collection point.

The fifth effluent stream (117) has the following gas composition: carbon dioxide 1.5% (mol.), nitrogen 2.56% (mol.), oxygen 0.19% (mol.), water vapor 20 ppmv, hydrogen sulfide less than 1 ppmv, and balance methane (≈95.75%) with a volumetric flow of 584.8 m$^3$/h. The fifth effluent stream (117) gas composition meets most RNG product specifications, although some pipeline specifications may require a lower oxygen product specification. The sixth permeate stream (114) has the following gas composition: carbon dioxide 42.01% (mol.), nitrogen 4.09% (mol.), oxygen 1.59% (mol.), water vapor 270 ppmv, hydrogen sulfide 9 ppmv, and balance methane at a volumetric flow of 273 m$^3$/h. The stream (114) is recycled and combined with the partly desulfurized and dehumidified gas upstream of the adsorption hydrogen sulfide removal unit (105).

The control valve (115) is used for stage cut control and the fifth effluent stream $CO_2$ and/or $O_2$ concentration management. The valve (115) is algorithmically opened if the concentration of $CO_2$ decreases below the desired product specification and closes if the concentration of $CO_2$ increases above the product specification thus regulating the stage cut of the second membrane unit directly and the stage cut of the first membrane separation unit indirectly. For more fine stage cut control, a temperature control of membrane stages is used exploiting the dependence of membrane permeability on temperature. For turndown management part of membrane surface is switched off.

The required residual oxygen content of the retentate fifth effluent stream (117) is determined by the product specification and can vary from 5 ppmv to 1% (mol). For a low residual oxygen product specification, optionally the retentate fifth effluent stream (117) or the retentate third effluent stream (110) is treated in a deoxygenation, deoxo, unit, where the gas is heated to a temperature of between 300 to 350° C., the oxygen is reacted with hydrocarbons in the presence of a catalyst followed by cooling of the gas and drying to the required consumer product specification. For low oxygen content products, the content of residual oxygen varies from 5 to 50 ppmv and is determined by the customer product specification.

In the embodiment wherein the third retentate effluent stream (110) is treated in the deoxygenation unit (112), the temperature of the treated gas is reduced by cooling the processed gas, the condensed water is separated, and the gas superheated to protect the second membrane separation unit from liquid water carryover. Additional drying of the thus treated gas is not required since the generated water vapor is removed in the second membrane unit (113) simultaneously with carbon dioxide permeation. The residual oxygen product specification by the deoxo unit (112) can be relaxed since the small amount of the residual oxygen is further removed by the second membrane unit (113). In this embodiment the sixth effluent stream (114) does not contain significant oxygen concentration and thus is not recycled to the front end of the biological desulfurization unit (102) nor to the front end of the adsorption unit (105). The sixth effluent stream (114) is thus recycled and combined with the second effluent stream (108) for further processing in a water vapor removal refrigeration unit.

In the embodiment wherein the fifth effluent stream (117) is treated in the deoxygenation unit (116), the gas treated in the deoxo unit is cooled, the condensed water if any removed and the gas is dryer to meet water vapor product specification. The oxygen content of the fifth effluent stream (117) is lower than the oxygen content of the third effluent stream (110) which provides for a reduced hydrocarbon loss related to gas deoxygenation.

The fifth effluent stream (117) is collected as a product at the pressure of 11.6 barg and temperature of 25° C. that meets most RNG product specifications.

The content of the residual nitrogen in the RNG product is determined by the customer specification and/or by the product heating value. For biogas streams with a high nitrogen content, the fifth effluent stream (117) is treated in a nitrogen rejection unit to meet product specifications.

For applications that require a low residual content of acid gases, such as LNG production, the fifth effluent stream (117) is directed to a supplemental acid gas removal unit that may be a membrane unit, an absorption unit, or a pressure swing adsorption unit. In some embodiments tail gases enriched in acid components are recycled to increase methane recovery and combined with the first effluent stream.

The present invention is described with reference to the FIGURE and several embodiments, which should not be construed as limiting the present invention.

The invention claimed is:

1. A process for removing acid gases from a raw biogas feed stream comprised of methane, carbon dioxide, nitrogen, oxygen and hydrogen sulfide, said process comprising the steps of:
   (i) processing a combined feed gas stream comprised of the raw biogas feed stream and at least one recycled gas stream generated by a membrane separation unit through a biological hydrogen sulfide removal system at a substantially atmospheric pressure, thus generating a first effluent stream with reduced hydrogen sulfide and oxygen content as compared to the combined feed gas stream, wherein said biological hydrogen sulfide removal system comprises bacteria that oxidizes hydrogen sulfide to elemental sulfur and sulfuric acid;
   (ii) compressing the first effluent stream in a compressor to a pressure from 6 to 25 barg followed by aftercooling and condensate separation, thereby forming a second effluent stream;
   (iii) passing the second effluent stream into a first membrane separation unit, wherein a first membrane removes a portion of oxygen and carbon dioxide from the second effluent stream, thereby forming a retentate third effluent stream having a reduced content of carbon dioxide as compared to the second effluent stream and a permeate fourth effluent stream enriched in oxygen and carbon dioxide as compared to the second effluent stream;
   (iv) passing the third effluent stream to a second membrane separation unit, wherein a second membrane removes a portion of carbon dioxide and oxygen from the third effluent stream, thereby forming a retentate fifth effluent stream having a lower carbon dioxide and oxygen content as compared to the third effluent stream and a permeate sixth effluent stream enriched in carbon dioxide and oxygen content as compared to the third effluent stream;
   (v) passing the fourth effluent stream to a third membrane separation unit wherein a third membrane removes a portion of carbon dioxide and oxygen from the fourth effluent stream, thereby forming a retentate seventh effluent stream having a lower carbon dioxide content as compared to the fourth effluent stream and a higher oxygen content as compared to the raw biogas feed stream and a permeate eighth effluent stream with a carbon dioxide concentration above 95 volumetric percent, wherein the eighth effluent stream is at substantially atmospheric pressure or a sub-atmospheric pressure;
   (vi) wherein the sixth effluent stream is recycled and comprises a portion of the recycled gas stream combined with the raw biogas feed stream in step (i) or wherein the sixth effluent stream is recycled and combined with the first effluent stream prior to compression in step (ii);
   (vii) wherein the seventh effluent stream is recycled and comprises at least a portion of the recycled gas stream combined with the raw biogas feed stream in step (i); and
   (viii) collecting the fifth effluent stream generated by the second membrane generation unit as a product, wherein the fifth effluent stream has an increased methane content and reduced hydrogen sulfide, oxygen and carbon dioxide content as compared to the raw biogas feed stream.

2. The process of claim 1 further comprising the step of collecting the eighth effluent stream generated by the third membrane separation unit as a product.

3. The process of claim 2 wherein the eighth effluent stream is additionally treated in a desulfurization unit to remove remaining hydrogen sulfide.

4. The process of claim 1 wherein at least a portion of the sixth effluent stream is combined with the raw biogas feed stream in step (i).

5. The process of claim 1 wherein the sixth effluent stream is combined with the first effluent stream prior to the combined stream being subjected to compression.

6. The process of claim 1 wherein at least one of the first effluent stream and the second effluent stream is treated in an adsorption unit to remove additional hydrogen sulfide not removed in the biological hydrogen sulfide removal system.

7. The process of claim 6 wherein an adsorbent in the adsorption unit comprises an activated carbon or activated carbon impregnated with a substance that is characterized by catalytic activity with respect to the oxidation of hydrogen sulfide in the presence of oxygen.

8. The process of claim 6 wherein at least a portion of the sixth effluent stream is combined with the first effluent stream upstream of the adsorption unit provided for hydrogen sulfide removal before the combined stream is subjected to compression.

9. The process of claim 1 wherein a supplemental oxygen-containing gas is injected into the biological hydrogen sulfide removal system to facilitate hydrogen sulfide removal.

10. The process of claim 1 wherein the combined feed gas stream is further comprised of a supplemental oxygen source stream.

11. The process of claim 1 wherein the first, second and third membrane separation units are equipped with semipermeable polymeric hollow fiber membranes exhibiting a $CO_2/CH_4$ gas separation factor above 20 and an oxygen/methane separation factor above 5.

12. The process of claim 11 wherein the first, second and third membrane separation units are equipped with semipermeable polymeric hollow fiber membranes exhibiting a $CO_2/CH_4$ gas separation factor above 30 and an oxygen/methane separation factor above 6.

13. The process of claim 12 wherein the first, second and third membrane separation units are equipped with semipermeable polymeric hollow fiber membranes exhibiting a $CO_2/CH_4$ gas separation factor above 40 and an oxygen/methane separation factor above 7.

14. The process of claim 11 wherein the first, second and third membrane separation units in at least one stage are equipped with semipermeable polymeric hollow fiber membranes that differ in gas separation characteristics.

15. The process of claim 1 wherein the third effluent stream is treated in a deoxygenation unit followed by aftercooling and condensate separation.

16. The process of claim 1 wherein the fifth effluent stream is treated in a deoxygenation unit followed by aftercooling, condensate separation and dehydration.

17. The process of claim 1 wherein a pressure boosting device is disposed between the first membrane separation unit and the third membrane separation unit.

18. The process of claim 1 wherein a vacuum pump is disposed on the eighth effluent stream to collect the eighth effluent stream at a sub-atmospheric pressure.

19. The process of claim 1 wherein the fifth effluent stream is treated in a nitrogen rejection unit.

20. The process of claim 1 wherein the fifth effluent stream is directed to a membrane unit or an adsorption unit to remove remaining acid gases with recycling of resulting tail gases enriched in acid components being combined with the first effluent stream.

21. The process of claim 1 wherein the first effluent stream or the second effluent stream or both are treated to reduce water vapor content upstream of the first membrane separation unit.

22. The process of claim 1 wherein an oxygen concentration in the raw biogas feed is below 5% by volume, a carbon dioxide concentration in the raw biogas feed is above 25 volumetric percent and a hydrogen sulfide concentration in the raw biogas feed is from 100 to 30,000 ppmv.

23. The process of claim 1 wherein the bacteria is a chemoautotrophic bacteria or a sulfur oxidizing bacteria.

24. The process of claim 23 wherein the bacteria is of a genus selected from the group consisting of *Thiobacillus, Acidithiobacillus, Achromatium, Beggiatoa, Thiothrix, Thioplaca, Thiomicrospira, Thiosphaera,* and *Thermothrix.*

25. The process of claim 24 wherein the bacteria is of the genus *Thiobacillus* or *Acidithiobacillus.*

26. The process of claim 1 wherein the bacteria consumes oxygen passed into said biological hydrogen sulfide removal system.

* * * * *